United States Patent Office 3,723,093
Patented Mar. 27, 1973

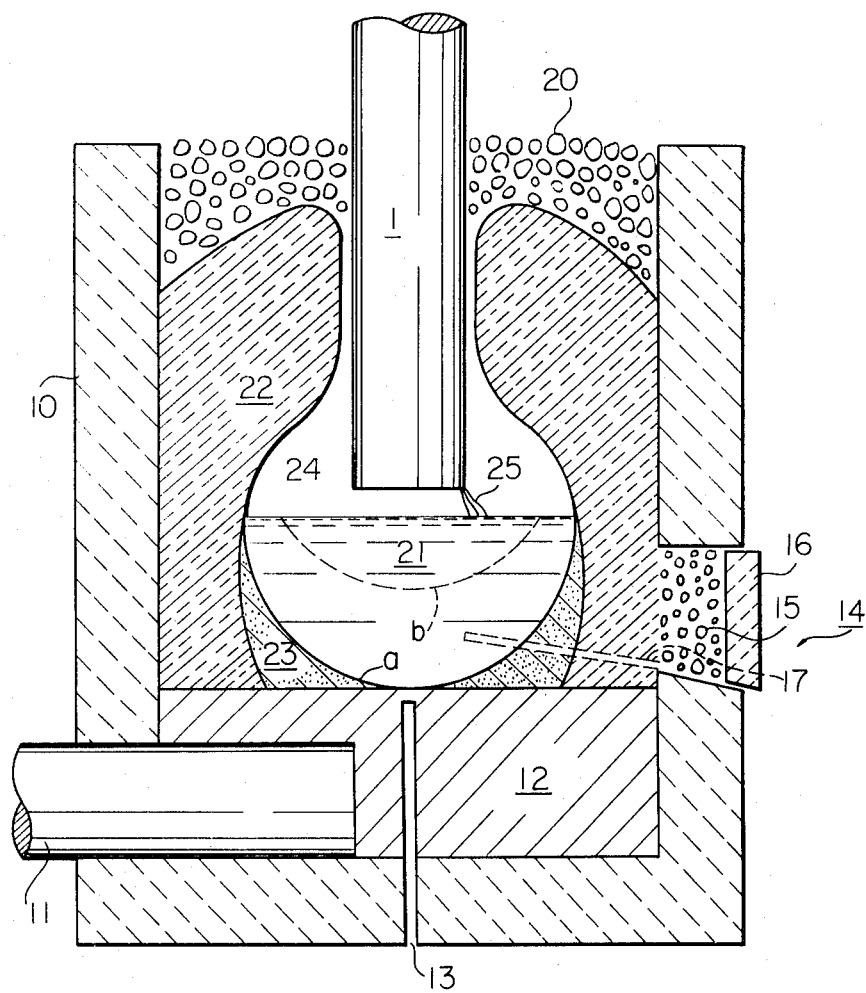
Fig. I

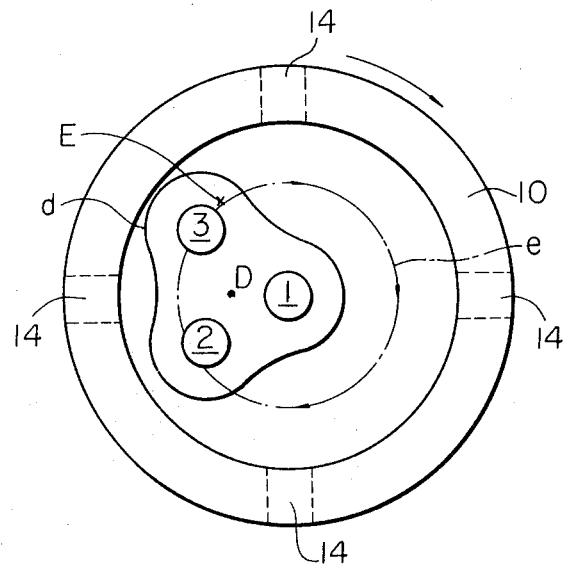
Fig. II
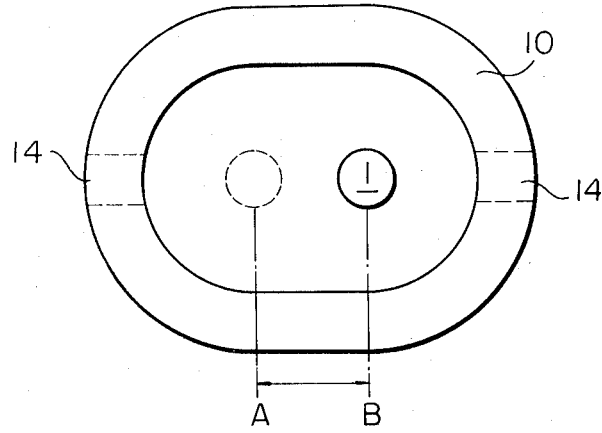
Fig. III

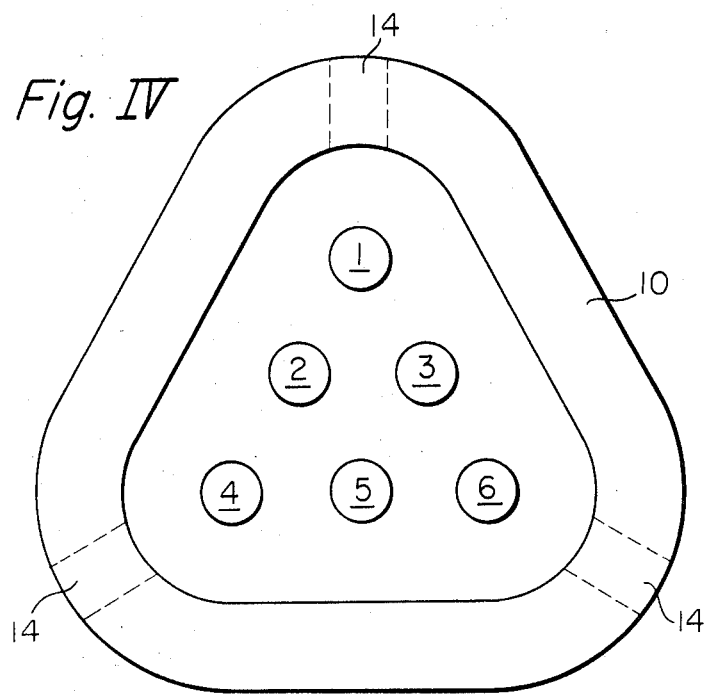
Fig. IV
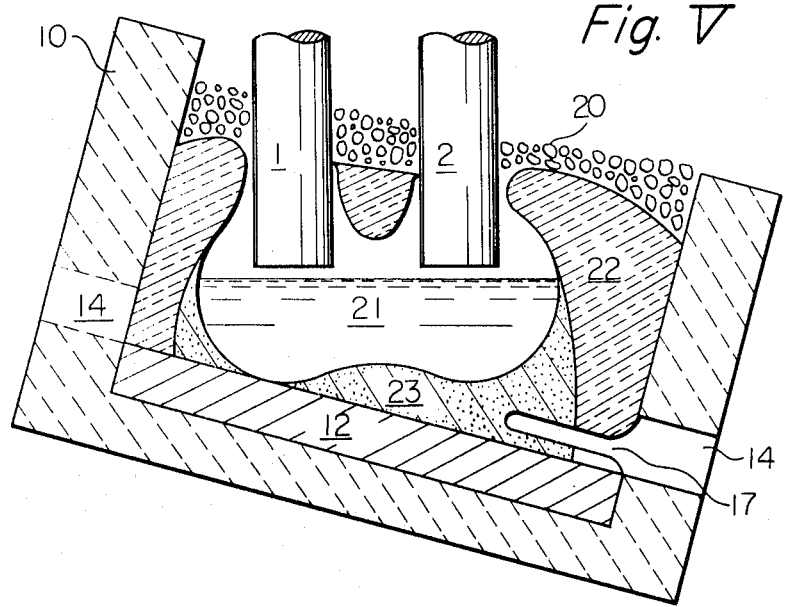
Fig. V

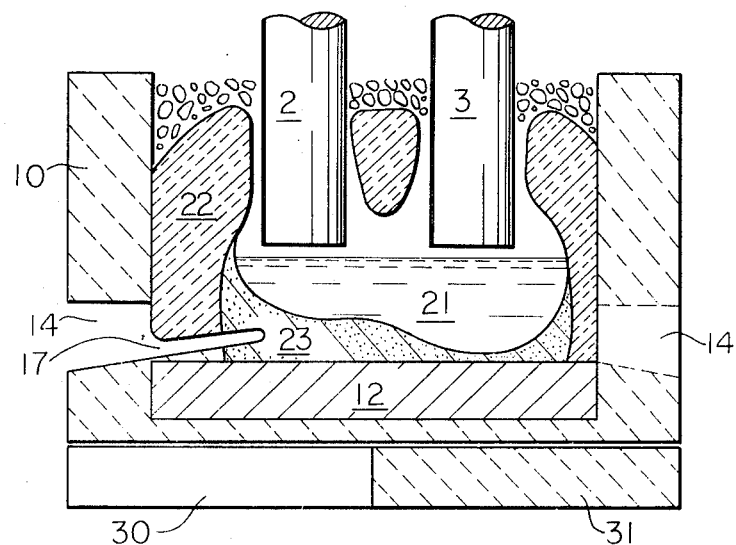
Fig. VIa
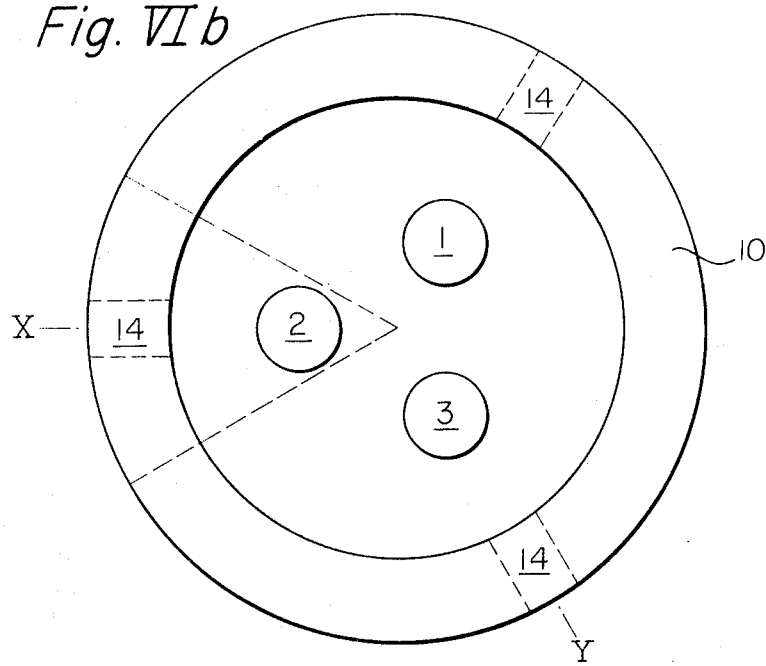
Fig. VIb

3,723,093
PROCESS FOR THE CONTINUOUS PRODUCTION OF ALUMINUM
Tadahisa Shiba, Tokyo, Tamekazu Saito, Junzo Tsurugi, and Masaru Takahashi, Yokohama, and Kunihiro Goto, Kawasaki, Japan, assignors to Showa Denko Kabushiki Kaisha, Tokyo, Japan
Filed May 5, 1970, Ser. No. 34,652
Int. Cl. C22f 7/00, 21/00; C22d 7/02
U.S. Cl. 75—10 R    7 Claims

ABSTRACT OF THE DISCLOSURE

A process for the production of aluminum which comprises subjecting a charge of alumina and carbon to the action of an electric arc in a furnace to form a molten mixture comprising aluminum and aluminum carbide, thereafter repeating the steps of (a) allowing the thus formed mixture to cool within the furnace to a temperature within the range of 1900–1400° C. (b) withdrawing free aluminum still in the molten state in said mixture out of the furnace and recovering the same, and (c) again subjecting the remainder in the furnace to the action of the electric arc, while feeding a subsequent charge of alumina and carbon, to form said molten mixture.

---

This invention relates to a commercially advantageous process for producing aluminum by the reduction of alumina with carbon in an electric furnace.

It is well known that aluminum and aluminum carbide are formed when alumina is reacted with carbon at an elevated temperature of such as about 2100–2500° C. This reaction is an endothermic reaction which, when summarized, can be expressed by the following Equations 1, 2 and 3.

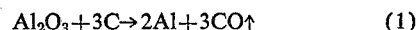
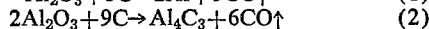
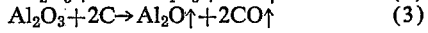

$$Al_2O_3 + 3C \rightarrow 2Al + 3CO\uparrow \quad (1)$$
$$2Al_2O_3 + 9C \rightarrow Al_4C_3 + 6CO\uparrow \quad (2)$$
$$Al_2O_3 + 2C \rightarrow Al_2O\uparrow + 2CO\uparrow \quad (3)$$

Numerous proposals have been made heretofore concerning the process of producing aluminum by the reduction of alumina with carbon in an electric furnace in accordance with the foregoing equations. In all of the processes suggested, the resulting mixture of aluminum and aluminum carbide is removed from the furnace in a molten state and the aluminum is separated from the mixture. The mixture, which has been removed out of the furnace and cooled down and solidified, consists of numerous crystallized aluminum carbide in the form of small, closed cellular shells within which aluminum is confined. Hence, considerable difficulty is experienced in separating the aluminum from the mixture. One of the methods of separation that has been proposed in the past is that wherein the aluminum is recovered by subjecting the mixture to vacuum distillation. Another method consists of mixing the foregoing mixture with a large quantity of a flux consisting of a halide of an alkali metal or alkaline earth metal and extracting the aluminum by heating the mixture at a temperature in the neighborhood of 1000° C. (U.S. Pats. 2,829,961, 2,974,032 and British patent specification No. 964,792). A still another method is that wherein the aforesaid mixture is winnowed while being comminuted in a grinder heated at about 700° C. to eliminate the solid finely divided aluminum carbide and recover the aluminum (German Pat. No. 1,188,818). These conventional methods of separation involve troublesome operations in all cases and also entail much expense. In consequence, the production on a commercial basis of aluminum by the reduction of alumina with carbon is being impeded.

It has now been found that free aluminum can be removed from the electric furnace wherein the mixture of aluminum and aluminum carbide was formed and that the reduction of alumina can be continued subsequently in the furnace. It is therefore a primary object of the present invention to provide an improved, commercially advantageous process for the continuous production of aluminum by the reduction of alumina with carbon in an electric furnace.

The present invention is fundamentally based on our recent discovery of the facts that when the molten mixture comprising aluminum and aluminum carbide formed in accordance with the foregoing Equations 1 and 2 at the temperature range of about 2100–2500° C. is cooled down, the aluminum carbide solidifies to form small cellular shells in which the aluminum is confined; that the formation of said cellular shells begins at about 2000° C. and is completed at about 1400° C.; and that when said mixture is held at about 1400–1900° C., the aluminum still in the molten state can flow or exude out by gravity from the gap in the partly formed cellular shells.

Thus, in accordance with the present invention, the mixture formed in the electric furnace is cooled in situ to a temperature within the range of 1400–1900° C., and free aluminum is removed externally of the furnace while the aluminum carbide is retained in the furnace. On the other hand, the subsequently fed alumina and carbon react and aluminum alone is again newly formed in accordance with the foresaid Equation 1.

More specifically, the invention is directed to a process of producing aluminum by the reduction of alumina with carbon, which comprises subjecting a charge of alumina and carbon to the action of an electric arc in a furnace and heating the charge to a temperature within the range of about 2100–2500° C., thereby forming a high temperature zone in which a molten mixture comprising aluminum and aluminum carbide is formed, and thereafter repeating the steps of (a) allowing the thus formed molten mixture to cool within the furnace to a temperature within the range of 1900–1400° C., thereby forming a low temperature zone in which the aluminum carbide is solidified, (b) withdrawing free aluminum still in the molten state in said low temperature zone out of the furnace and recovering same while retaining the solidified aluminum carbide in the furnace, and (c) again heating said low temperature zone, while feeding a subsequent charge of alumina and carbon thereto, to a temperature within the range of about 2100–2500° C. to produce aluminum and again form the high temperature zone in which a molten mixture comprising the newly produced aluminum and the aluminum carbide to be retained is formed.

The high temperature zone, as can be seen from the foregoing description, is meant to be the zone in which the reacting materials by being heated at 2100–2500° C. by means of the heat of the electric arc form the molten mixture comprising aluminum and aluminum carbide. This zone is formed in the hearth below the electrode whereto the arc energy is effectively supplied. On the other hand, the low temperature zone is meant to be the zone in which said molten mixture is cooled to 1900–1400° C. and the aluminum carbide solidifies but the aluminum is still in the molten state. The formation of this latter zone, which starts from that part remote from the heat source, progresses towards that part nearer thereto as the cooling proceeds. It is not necessary in this case for the whole of the high temperature zone to be transformed into the low temperature zone. The formation of the low temperature zone is accomplished by decreasing the amount supplied to this zone of the heat energy generated by the electric arc. Alternatively, the low temperature zone can also be formed by increasing the heat conduction from the zone to the outside of the furnace. Specifically, this can be carried out in the former case by either interrupting or decreasing the electric power that is supplied via the electrodes, by raising the operating voltage while supplying the constant electric power, by moving the electrodes to a position more remote from said zone, or by increasing the feeding rate of the charge. On the other hand, in the latter case, i.e. for increasing the amount of heat conducted to the outside of the furnace, this can be carried out by the forced cooling from the outside of the furnace of that part which is correlative situated with respect to the zone, e.g., the forced cooling of the hearth by means of a coolant from the outside thereof.

If in step (b) a hole is pierced in the hearth extending from the lower side part thereof to the low temperature zone, the molten free aluminum flows out to the outside of the furnace by gravity. The rate at which the aluminum flows out slows down as the amount of aluminum present in the low temperature zone decreases. The aluminum present need not necessarily be all withdrawn. Upon completion of the withdrawal of the aluminum, the passage is again closed by means of a filler. In step (c) the low temperature zone which has become rich in aluminum carbide is heated along with the subsequently fed alumina and carbon and is again transformed into a high temperature zone with the amount of aluminum therein again increasing.

The starting materials to be used in the invention will now be described. For achieving the most desirable results in practicing the hereinbefore described invention process, the following three points must be taken into consideration in deciding on the weight ratio of the charge of alumina and carbon.

The first point concerns the amount of the carbon of the electrodes consumed by their participation in the reaction within the furnace. The amount of carbon in the charge must be reduced by an amount corresponding to the amount of carbon of the electrodes that is consumed in the reaction. It was found that the carbon consumption of the electrodes was usually 0.04–0.05 kg. per each kg. of alumina in practicing the invention process.

The second point concerns the loss of the carbon by combustion with air. To compensate for this loss, the amount of carbon in the charge must be correspondingly increased. It was found that this loss in practicing the invention process was usually 0–10% of the carbon charged.

The third point concerns the reaction that takes place in the furnace. If an excess of carbon is present, aluminum carbide tends to be formed, whereas if an excess of alumina is present, aluminum suboxide ($Al_2O$) tends to be formed. It was found that an increased formation of aluminum carbide could be avoided in the invention process when 5–15% of the alumina in the charge transforms to $Al_2O$.

On the basis of our foregoing findings, the preferred proportion of the two compounds in 100 parts of the charge is established within the following range. The lower limit of the amount of alumina, i.e., the proportion of alumina when (A) the amount of electrode consumption=0.04 kg./kg. $Al_2O_3$, (B) the amount of loss of carbon of the charge by oxidation=10% and (C) the amount of loss of the alumina charged as a result of $Al_2O$ formation=5%, is 74.5 parts by weight. On the other hand, the upper limit of the amount of alumina, i.e., the proportion of alumina when (A)=0.05 kg./kg. $Al_2O_3$, (B)=0% and (C)=15%, is 78 parts by weight. Therefore, in practicing the invention process, the weight ratio of alumina to carbon of the charge is most preferably in a range of 74.5:25.5 to 78:22.

According to the invention, the continuous production of aluminum can be carried out by the repitition of the aforesaid steps (a)–(c). The performance of these steps is not limited to only one region in a furnace but may be practiced by the formation of the high and low temperature zones alternately in a plurality of regions in the furnace.

The aluminum withdrawn directly out of the furnace in accordance with the invention is of commercial purity and does not contain any aluminum carbide. Hence, the troublesome and expensive after treatments that were required in the case of the prior art is not necessary and also there is no loss of aluminum carbide.

Several preferred embodiments of the invention will now be described, reference being had to the accompanying drawings. However, since various combinations of these embodiments as well as modifications thereof may be resorted to without departing from the spirit and scope of the invention, as those skilled in the art will readily understand, it is to be understood that this invention is not limited to the specific embodiments thereof except as defined in the appended claims.

The several figures are simplified schematic sectional elevation views or schematic plan views of furnaces which may be employed for the production of aluminum in accordance with the practice of this invention.

FIG. I is a sectional view of a single-phase alternating current electric furnace equipped with a single electrode.

FIG. II is a plan view illustrating in a simplified manner a three-phase eccentric rotating furnace wherein the furnace body, which is capable of rotating about its central axis, is provided with three electrodes, the triangle formed by said three electrodes as vertices having a center which is eccentrically disposed relative to the center of the furnace.

FIG. III is a plan view of a single-phase furnace provided with a single electrode which is capable of being shifted in the lateral direction. This also may be of the type wherein the electrode is fixed and the furnace is capable of lateral movements.

FIG. IV is a plan view illustrating a multi-phase electric furnace equipped with a plurality of electrodes.

FIG. V is a sectional elevational view of a two-phase electric furnace provided with two electrodes and in which the furnace can be tilted.

FIG. VI–a is a sectional elevational view of a three-phase electric furnace equipped with three electrodes and having at the bottom and externally of the furnace a cooling element as well as heat-insulating element which are rotatably disposed; FIG. VI–b being a plan view of the foregoing furnace.

The reference numerals and characters used in the foregoing figures denote like parts in the several figures.

Embodiment (1)

In FIG. I, 1 is the carbon electrode, 10 is the refractory wall forming the outer wall of the electric furnace, 11 is the lead electrode, 12 is the bed carbon, and 13 is the hole pierced into the bed carbon from its underside to permit measurement of the temperature. A charge 20 made up of alumina and carbon is fed to the furnace and power is supplied to the electrode 1. When the charge as a result of being subjected to the action of the electric arc is heated to 2100–2500° C., a molten mixture comprising aluminum and aluminum carbide 21 is formed in the zone below the electrode, and thus the high temperature zone is formed. The reference numeral 22 denotes the self-lining layer which forms during the operation, 23 is a region formed by the setting and solidification of aluminum carbide, 24 is an empty region and 25 is the electric arc. Next, when the power supplied to the electrode 1 is suspended or decreased the quantity of heat supplied to the high temperature zone decreases, with the consequence that the temperature of said zone gradually falls starting from that part close to the bottom of the furnace. That is to say, the drop in temperature proceeds from the part indicated in the figure by line $a$ to the part indicated by line $b$. Thus, the high temperature zone is gradually reduced in its extent. That part whose temperature declines to 1900–1400° C. forms the low temperature zone.

Next, the layer of a filler 15 such as coke and a cover 16 which have been closing the tapping port 14 are removed, and a hole 17 is made extending into the low temperature zone. The aluminum which is still in a molten state in the mixture flows out to the outside of the furnace via the hole 17 and is recovered. After the flow of the aluminum has been completed, the tapping port 14 is closed as previously indicated and the supply of power to the electrode 1 is resumed while continuing the feed of charge 20. By operating in this manner, the high temperature zone again starts its expansion and the aforesaid low temperature zone is again transformed into a high temperature zone. By repetition of the foregoing operations the subsequent recovery of aluminum becomes repetitiously possible.

The foregoing embodiment does not require any special equipment but can be practiced using the usual electric furnace. However, since the supply of power is intermittently carried out, a decline in the rate of operation of the furnace is inevitable.

Embodiment (1')

While the reduction of the quantity of heat supplied to the high temperature zone was carried out in the foregoing embodiment (1) by either suspending or reducing the power supplied to the electrode, this reduction of heat supplied can also be accomplished by regulating the voltage and/or feeding rate of the starting materials. An embodiment of this type will be described hereunder.

The furnace is operated while maintaining the power input practically constant. In the meantime a period in which the voltage is lowered by causing the electrode to descend while at the same time the feeding rate of the charge of alumina and carbon is decreased (period H) and a period in which the voltage is raised by causing the electrode to ascend while at the same time the feeding rate of the charge of alumina and carbon is increased (period L) are repeated in alternation. During this time a high temperature zone is formed below the electrode during period H and a low temperature is formed during period L. This embodiment wil be described relative to the instance where, for example, an electric furnace such as shown in FIG. I is used. As shown in the figure, the high temperature zone 21 is formed below the electrode 1, after which the electrode is withdrawn upwardly from its existing position to some extent, the voltage being raised at this time to ensure the maintenance of the power input at a constant level. Simultaneously, the feeding rate of the charge of starting material is increased. Since the distance between the lower end of the electrode and the high temperature zone is increased by the withdrawal upwardly of the electrode, only a minor amount of the heat of the electric arc is transmitted to the mixture of aluminum and aluminum carbide present in the high temperature zone. At the same time, since the high temperature zone cools down as the feeding rate of the starting material is increased due to the fact that the reaction is endothermic, the low temperature zone is formed gradually starting from that part close to the bed carbon. When the low temperature zone has thus been formed, free aluminum is withdrawn out of the furnace from this low temperature zone. Next, while maintaining the power input constant the voltage is reduced and the electrode is again caused to descend to its original position, and the feeding rate of the starting material is decreased, whereupon a high temperature zone is again formed as previously described. By repeating the foregoing cycle, free aluminum can be obtained while continuously supplying the electric current.

The rate of operation of the electric furnace does not decline in the case of this embodiment as compared with the case of embodiment (1), because the supply of power is continuous. However, this embodiment requires the technique involved in properly controlling the feeding rate of the charge and manipulation of the voltage.

Embodiment (2)

A mode of practicing the invention process using the three-phase eccentric rotating electric furnace shown in FIG. II will be described. This furnace is made up of three electrodes 1, 2 and 3 which are secured at the vertices of a triangular form disposed eccentrically of the center of the furnace and having D as its center, and a furnace having a refractory wall 10 and capable of rotation in the clockwise direction. The broken line $e$ shown in the figure indicates the locus about which a point E of the furnace moves in concomitance with the rotation of the furnace. On the other hand, the solid line $d$ shows the scope of the high temperature zone formed below the three electrodes. The low temperature zone is formed to the outside of the high temperature zone. The locus $e$ passes through both the high and low temperature zones. In the high temperature zone the aluminum-rich molten mixture at the point E near the electrode 3 moves along the broken line $e$ as the furnace body rotates. It first crosses line $d$, and as it becomes more remote from the high temperature zone, it gradually cools and forms aluminum carbide crystals. As as a result, a low temperature zone suitable for tapping the aluminum out of the furnace is formed, and free aluminum is withdrawn externally of the furnace via the tapping port 14. The zone containing the solidified aluminum carbide retained in the furnace moves further and, as it approaches the electrode 2, rises in temperature to again enter the high temperature zone bounded by the line $d$. Here the solidified aluminum carbide again melts and, as it proceeds through the high temperature zone, mixes with newly formed aluminum and while forming an aluminum-rich molten solution returns to the original point E. When the hereinabove described operation is carried out contiuously, aluminum can be subsequently obtained.

This embodiment possesses the following advantages. Generally speaking, it is highly difficult to maintain the operation of an electric furnace completely constant at all times. For example, it is practically impossible to maintain both the electric power and the feeding rate of the charge completely constant. This applies in the case of the invention process also, and the conditions of the furnace including the conditions involved in the transition between the high and low temperature zones are to some extent variable. However, in the case of the here described embodiment (2), these changes in the furnace conditions can be dealt with by a suitable choice of the speed at which the furnace rotates and the period in which the aluminum is tapped. Further, this embodiment can be employed with the conventional three-phase rotating furnace by changing the position of the rotating shaft or positions in which the electrodes are secured. In addition, since the power is continuously supplied, no decline in the rate of operation occurs.

Embodiment (3)

Employment of an electric furnace of the type such as shown in FIG. III instead of the electric furnace shown in FIG. II provides similar results. This furnace is made up of an electrode 1 which is capable of reciprocally moving horizontally and a furnace body having an elliptical refractory wall 10. As shown in the figure, a high temperature zone is formed below the electrode 1 which is disposed in a position corresponding to B, and a low temperature zone is formed below the position corresponding to A, which is remote from the electrode. As a result of a reciprocative movement, a phenomenon similar to that described with respect to embodiment (2) is achieved, with the consequence that aluminum can be subsequently withdrawn out of the furnace.

Embodiment (4)

FIG. IV illustrates an embodiment wherein the electric furnace being equipped with a plurality of electrodes exceeding the number of alternating current phases is suitable for operation by a multiphase electric current. The figure is a plan view of an electric furnace made up of 1–6 electrodes and a refractory wall 10 provided with three aluminum tapping ports 14. An embodiment operated with a 3-phase electric current will be described hereunder. While feeding the charge of alumina and carbon, first, a 3-phase alternating current is supplied to the combination of electrodes 1, 2 and 3 of the furnace to form a high temperature zone below these electrodes. Next, the current is switched to the combination of electrodes 2, 4 and 5 to form the high temperature zone below these electrodes. This is then followed by switching the current to the combination of electrodes 3, 5 and 6 to form the high temperature zone below these electrodes. In this manner a high temperature zone is formed below the electrodes during the period while current is supplying and a low temperature zone is formed below the electrodes during the period while current is not supplying, with the consequence that free aluminum can be withdrawn out of the furnace.

The embodiment has the advantage that the furnace body and electrodes need not be movable and that the power can be supplied continuously.

Embodiment (5)

FIG. V illustrates an electric furnace made up of two electrodes and a furnace which can be tilted in either direction from its horizontal position. The figure shows electrodes 1 and 2 through which flows a 2-phase alternating current and a furnace which presently is tilted towards the right. With the furnace in this state, the distance between the bed carbon and the electrode 1 is small. As a result, a high temperature zone is formed below the electrode 1 to a point near the bed carbon. On the other hand, since the electrode 2 is remote from the bed carbon, a low temperature zone is formed in the region near the bed carbon, from which free aluminum is withdrawn out of the furnace. Next, when the furnace is tilted to the left, the high and low temperature zones are formed below the electrodes 2 and 1, respectively. Thus, by alternating the tilt of the furnace in both directions, the continuous recovery of aluminum becomes possible.

This embodiment is suited for use in the case of a small scale furnace. In the case of a three-phase furnace, a tilting mechanism suited for such a furnace is provided. As already described in connection with embodiment (2), fluctuations in the conditions of the furnace can be dealt with by a suitable choice of the timing of the tilt as well as tapping period. Since the transition from the high and low temperature zones takes place in the perpendicular direction, the floor space occupied by the furnace body is less than in the case of embodiment (2). Therefore, the surface area of the furnace is also small and there is also the advantage that the heat loss is less.

Embodiment (6)

FIGS. VI–a and VI–b are views illustrating an embodiment wherein a plurality of electrodes corresponding to the number of phases of the alternating current are disposed in a furnace, below which bottom is provided separately but adjacent thereto a rotating member made up of a cooling element and a heat-insulating element, whereby when an electric current is supplied to the electrodes and the rotating member is slowly rotated horizontally and concentrically of the hearth, high and low temperature zones are formed in the hearth regions which happen to be respectively above the heat-insulating and cooling elements which rotate below the hearth. The figure shows a three-phase electric furnace equipped with three electrodes 1, 2 and 3 and three tapping ports 14, FIG. IV–a being sectional view taken along lines X–Y of FIG. VI–b. The reference numeral 30 denotes the cooling element in which a coolant, e.g. water, can pass, while 31 is the heat-insulating element made of refractory. These two elements slowly rotate along the underside of the furnace as an integral rotating member. In the figures shown, the heat-insulating element 31 is presently at a position below the electrodes 1 and 3, thus forming the high temperature zone in the corresponding region in the hearth. On the other hand, the cooling element 30 is at a position below the electrode 2, thus forming the low temperature zone in the hearth corresponding thereto. As a result free aluminum is being withdrawn out of the furnace therefrom. As the rotating member slowly rotates, high and low temperature zones are successively formed below the electrodes, with the consequence that the continuous recovery of aluminum is made possible.

In the case of the embodiment hereinabove described, the restrictions imposed as to the make-up and method of installation of the heat-insulating and cooling elements are quire severe. Hence, this embodiment, rather than being used independently, is preferably used in combination with the other embodiments.

While the invention and the various embodiments thereof have been described in connection with the production of aluminum, they also may be applied in like maner to the production of aluminum alloys comprising a major amount of aluminum and a minor amount of other metals.

With the foregoing embodiments as a basis, the following examples are given for more specifically illustrating the present invention.

EXAMPLE 1

This example describes an experiment in accordance with the hereinbefore described embodiment (1), reference being had to FIG. I. A single-phase submerged electric arc furnace of an inside diameter of 40 cm. and equipped with a single carbon electrode of 10 cm. diameter was used.

The briquettes of starting materials used were made in the following manner. Aluminum hydroxide powder in accordance with the Bayer method was converted to alumina powder by dehydration by heating at 600–1000° C. This alumina powder and petroleum coke powder were mixed in a weight ratio of 75:25, after which 100 parts by weight of the mixture were mixed together with 30 parts by weight of an organic binder, an aqueous 6% solution of polyvinyl alcohol. The mixture was then compression molded into almond-shaped briquettes having a long diameter of 4 cm. using a double roll briquet machine, following which the briquettes were dried for 4 hours in 100–150° C. air stream. Briquettes having a bulk specific gravity of about 1.3 and of high strength at room temperature were obtained. These briquettes were also used in Examples 2–5.

The starting operation to bring the furnace up to its steady condition was carried out in the following manner. Three kg. of a mixed mass of aluminum and aluminum carbide were placed on the bed carbon, and an arc was generated between this mixed mass and the electrode thereby starting the heating operation. At the same time the feed of the briquettes was begun, the accumulation of the briquettes on the bed carbon to a height of 50 cm. being accomplished during a period of 4 hours. In the meantime an operating voltage of 32 volts was maintained while the power was gradually raised so as to effect an increase in the current from 1000 amperes to 2000 amperes at the end of the 4-hour period. The depositing of the mass of aluminum and aluminum carbide on the bed carbon at the start is merely for facilitating the starting operation, and it is self-evident that this need not necessarily be done in practice.

The subsequent operation was carried out in a steady state by maintaining the voltage at about 35 volts, the current at about 2000 amperes, the power factor at about 0.7, the power supplied at about 50 kilowatts, and the feeding rate of the briquettes at about 5 kg. per hour. Under these conditions the molten mixture of $Al:Al_4C_3$ in a weight ratio of about 80:20 was formed at the rate of about 1.5 kg. per hour, and the liquid level of the mixture rose at the rate of about one centimeter per hour. When a carbon rod was inserted vertically downward into the molten mixture formed after 13 hours had elapsed from the start of the operation and the state of the mixture was examined, it was found that solidification of the mixture had occurred to a height of 2 centimeters above the bed carbon and the mixture thereof up to a height of 13 centimeters was in a molten state.

The power supply was then stopped and the furnace was allowed to stand in this state for one hour, whereupon the molten mixture, as a result of being cooled, gradually solidified from the bed carbon side to the electrode side, the solidified portion reaching as high as 7 centimeters above the top of the bed carbon. The temperature of the bed carbon at the measuring hole was 1500° C. Then a steel rod one inch in diameter was used and a passage was made from the tapping port to the middle of the furnace so as to reach a point 3 centimeters above the bed carbon, whereupon free aluminum flowed out via this passage to the outside of the furnace. The temperature at this point in the middle of the furnace was 1700° C. While the rate of flow of the aluminum gradually slowed down, 7 kg. of aluminum was obtained in 20 minutes.

Next, the tapping port was closed and, after lowering the electrode a little, power was again supplied and the operation of the furnace was again returned to the steady operating conditions previously indicated. Six hours later, the power supply was again stopped as in the previous instance, the resulting molten mixture was cooled, and aluminum was withdrawn out of the furnace. The foregoing cycle was repeated, and in each instance the amount of aluminum withdrawn averaged 7 kg. Upon analysis of the recovered aluminum, it was found to have a purity exceeding 99.5%, the amount of aluminum carbide contained being a small amount of below 0.01%.

EXAMPLE 2

This example describes an experiment in accordance with the hereinbefore described embodiment (2), reference being had to FIG. II.

A 3-phase eccentric rotating furnace of the following design was used. The furnace having a body capable of rotating at the rate of ⅓–2 turns per day was provided with three electrodes of 154 mm. diameter each of which was disposed at each vertex of an equilateral triangular form whose one side measured 325 mm., the distance between the center of this equilateral triangular form and the center of the furnace being 200 mm. The power supplied averaged 250 kilowatts and the feeding rate of the briquettes was 30 kg. per hour. The rate at which the furnace body was rotated was varied in accordance with the conditions of the furnace but averaged one turn per day. The tap-out period of the resulting aluminum was decided on each occasion with reference to the temperature measured by way of a temperature measurement hole pierced into the bed carbon. About 220 kg. per day of free aluminum was obtained.

EXAMPLE 3

This example describes an experiment in accordance with the hereinbefore described embodiment (3), reference being had to FIG. III. A single-phase submerged electric furnace equipped with a single electrode 10 cm. in diameter was used. The electrode was positioned in the exact center of the furnace and the operation was started as in Example 1. After a starting operation of 4 hours, the electrode was moved slowly towards the right at the rate of 5 centimeters per hour while continuing the supply of power. After the electrode had moved a distance of 7.5 centimeters from the center, it was stopped and held at this point for 2 hours. Next, the electrode was moved to the left at the rate of 5 centimeters per hour. When the electrode had reached a point 7.5 centimeters left of the furnace center after a period of 3 hours, it was stopped and held there for 2 hours. The reciprocal movement of the electrode was repeated in this manner, the power input and the feeding rate of the briquettes being as in Example 1 during the meantime. One cycle of the reciprocal movement of the electrode was 10 hours.

The temperature as measured by way of the temperature measurement orifice at the right side of the furnace when the electrode was at the left side of the furnace 21 hours after the start of the operation was 1400° C. Accordingly, aluminum was withdrawn from the tapping port at the right side of operating as in Example 1. The temperature of the so withdrawn aluminum at the inner end of the passage was about 1600° C. Seven kg. of free aluminum was withdrawn out of the furnace during a period of about 20 minutes, after which the tapping port was closed. Next, when the electrode had reached the end of its travel at the right side of the furnace and was standing still, aluminum was withdrawn in like manner from the tapping port located at the left side of the furnace. The foregoing operations could be repeated. The purity of the withdrawn aluminum was 99.5%.

EXAMPLE 4

This example describes an experiment in accordance with the hereinbefore described embodiment (4), reference being had to FIG. IV. A 3-phase submerged electric furnace having 6 electrodes and 3 tapping ports, as shown in the figure, was used. The electrodes were 10 cm. in diameter, and the distance between the center of each electrode was 23 cm. A voltage of 35 volts and an amperage of 2000 amperes were used, the power supplied being 150 kilowatts. After depositing 30 kg. of a mixed mass of aluminum and aluminum carbide on the bed carbon, power was first supplied to the three electrodes 2, 3 and 5 disposed in the middle part of the furnace, and the starting operation was carried out for 4 hours as in Example 1. Subsequently, the power was supplied in rotation successively to the combination of electrodes (1, 2, 3), (2, 4, 5) and (3, 5, 6), the power being supplied to each combination for a period of 4 hours each and the rotational supply of power being repeated. In the meantime, the briquettes were fed at the rate of 17 kg. per hour.

After 22 hours had elapsed from the start of the operation and when power was being supplied to the electrodes 2, 4 and 5, aluminum was withdrawn from the zone below electrode 6, whose temperature was about 1600° C. Eighteen kg. of aluminum were obtained in 40 minutes. In this manner, aluminum was withdrawn successively at 4-hour intervals from the tapping ports.

EXAMPLE 5

This example describes an experiment in accordance with the hereinbefore described embodiment (5), reference being had to FIG. V. A 2-phase submerged electric arc furnace made up of a furnace body capable of being tilted at an angle of 15 degrees in both directions from the horizontal position and equipped with two electrodes 10 cm. in diameter, the distance between which centers is 20 cm., was used. The furnace operating conditions were: voltage 35 volts, amperage 2000 amperes and power supplied 100 kilowatts. The operation was started by holding the furnace body in its horizontal position and depositing 10 kg. of a mass of Al-Al₄C₃ on the bed carbon. After a preheating period of 4 hours, the feeding rate of the briquettes was maintained at 11 kg. per hour. After 8 hours had elapsed after the start of the operation, the furnace body was tilted to the right at the rate of six degrees per hour and when angle of inclination reached 15 degrees the furnace body was held in this position for one hour. Thereafter, the furnace body was tilted in like manner in the opposite direction at the rate of 6 degrees per hour until it was tilted 15 degrees to the left, where it was held for one hour. This 6-hour half cycle operation was repeated. At each half cycle interval, about 19 kg. of free aluminum was withdrawn over a 40-minute period from the region below the electrode at the side the furnace was tilted, the temperature of this region being 1700–1750° C. at the time.

EXAMPLE 6

This example describes an experiment carried out in accordance with the hereinbefore described embodiment (1'), reference being had to FIG. I.

The briquettes used were made in the following manner. Aluminum hydroxide powder in accordance with the Bayer method was heated at 500° C. to obtain alumina powder. One hundred parts by weight of the so obtained alumina powder, 20 parts by weight of dried sawdust and 65 parts by weight of medium pitch were mixed at 120–140° C., after which the mixture was molded into briquettes by pressing and thereafter calcined at above 500° C. for 30 minutes. These briquettes had a bulk density of 0.7–0.8 and their alumina to carbon weight ratio composition was about 75:25.

The same single-phase furnace such as was used in Example 1 was used, and the operation was carried out as in Example 1 up to 15 hours after the start. Next, the electrode was withdrawn upwardly for a period of 3 hours, and while maintaining a voltage of 38 volts, amperage of 1800 amperes and power supplied of 50 kilowatts, the feeding rate of the briquettes was increased to 6 kg. per hour and maintained at this rate. Thus, a zone having a temperature of about 1800° C. was formed below the electrode, from which zone 9 kg. of free aluminum was withdrawn over a period of about 30 minutes via the tapping port. Thereafter the operating conditions were changed to a voltage of 32 volts, amperage of 2200 amperes, power supplied of 50 kilowatts and feeding rate of the briquettes of 4 kg. per hour, and the operation was continued for 3 hours. As a result, a zone consisting of a molten mixture of aluminum and aluminum carbide having a temperature of about 2200° C. was formed below the electrode. By repeating the foregoing operations in alternation, free aluminum of high purity was withdrawn successively.

We claim:

1. A process of producing aluminum by the reduction of alumina with carbon which comprises (a) subjecting a charge of alumina and carbon to the action of an electric arc in a furnace and heating the charge to a temperature within the range of about 2100–2500° C., thereby forming a high temperature zone in which a molten mixture comprising aluminum and aluminum carbide is formed, (b) allowing the molten mixture formed in step (a) to cool by an interruption or decrease in the amount of heat supplied to said high temperature zone by an interruption or decrease in the electric power supplied, within the furnace to a temperature within the range of 1900–1400° C., thereby forming a low temperature zone in which the aluminum carbide is solidified, as partly formed cellular shells, (c) withdrawing free aluminum while still in the molten state in said low temperature zone out of the furnace, by tapping the aluminum which exudes out by gravity from the gap in the partly formed cellular shells of said solidified aluminum carbide, and recovering said free aluminum while retaining the solidified aluminum carbide in the furnace, (d) heating said low temperature zone, while feeding a subsequent charge of alumina and carbon to said low temperature zone, to a temperature within the range of about 2100–2500° C. to produce aluminum, again forming a higher temperature zone in which a molten mixture comprising the newly produced aluminum and the retained aluminum carbide is formed, and (e) successively repeating steps (b) through (d) with subsequent successive and alternate formation of said high and low temperature zones.

2. The process of claim 1 wherein the charge of alumina and carbon is a mixture wherein the weight ratio of alumina to carbon is 74.5:25.5 to 78:22.

3. The process of claim 1 wherein the high and low temperature zones are alternately formed in one region in the furnace and alternately formed in another region in the furnace, the formation of the high temperature zone in one region coinciding with the formation of the low temperature zone in the other.

4. The process of claim 3 wherein the high and low temperature zones are formed by effecting the horizontal movement of the relative position of an electrode supplied with power and the furnace, thereby forming the high temperature zone in the region above where said electrode is presently positioned while forming the low temperature zone in the region above where the electrode had originally been positioned but has become removed therefrom as a result of its movement.

5. The process of claim 3 wherein the high and low temperature zones are formed by providing the furnace with a plurality of electrodes in excess of the number of phases of the alternating current; supplying with power a combination of electrodes in a number corresponding to the number of phases of the alternating current; thereafter supplying with power another combination of a similar number of electrodes, thereby forming the high temperature zone in the region below the electrodes being supplied with power while forming the low temperature zone in the region below the electrodes not being supplied with power.

6. The process of claim 3 wherein the high and low temperature zones are formed by providing the furnace with a plurality of electrodes corresponding to the number of phases of the alternating current; maintaining the electrodes while being supplied with power in an unchanged position and alternately tilting the furnace body, thereby forming the high temperature zone in the region below the electrode at that side of the furnace where the distance between said electrode and the carbon bed has been decreased as a result of the furnace body having been tilted and forming the low temperature zone in the region below the electrode at that side of the furnace where the distance between the electrode and the carbon bed has been increased.

7. The process of claim 1 wherein the high and low temperature zones are formed by employing a furnace equipped with at least one electrode and maintaining the power input substantially constant at all times, alternately repeating a period H wherein the voltage is lowered by lowering the electrode and at the same time the feeding rate of the charge of alumina and carbon is decreased, and a period L wherein the voltage is raised by raising the electrode and at the same time the feeding rate of the charge of alumina and carbon is increased, whereby the high temperature zone is formed during the period H and the low temperature zone is formed during the period L.

(References on following page)

References Cited

UNITED STATES PATENTS

| | | | |
|---|---|---|---|
| 3,410,680 | 11/1968 | Sparwald | 75—68 |
| 3,068,092 | 12/1962 | Menegoz | 75—63 |
| 1,896,088 | 2/1933 | Kern | 75—94 |
| 2,776,884 | 1/1957 | Grunert | 75—68 |
| 2,829,961 | 4/1958 | Miller | 75—68 |
| 3,338,708 | 8/1967 | Marukawa | 75—68 |
| 3,290,141 | 12/1966 | Johnson | 75—68 |

FOREIGN PATENTS

| | | | |
|---|---|---|---|
| 831,637 | 3/1960 | United Kingdom | 75—68 |
| 964,792 | 7/1964 | United Kingdom | 75—68 |

L. DEWAYNE RUTLEDGE, Primary Examiner

P. D. ROSENBERG, Assistant Examiner

U.S. Cl. X.R.

75—63, 68 R